Jan. 13, 1970 W. A. REID 3,488,900
CAMPING FLOOR PANEL
Filed Dec. 7, 1967
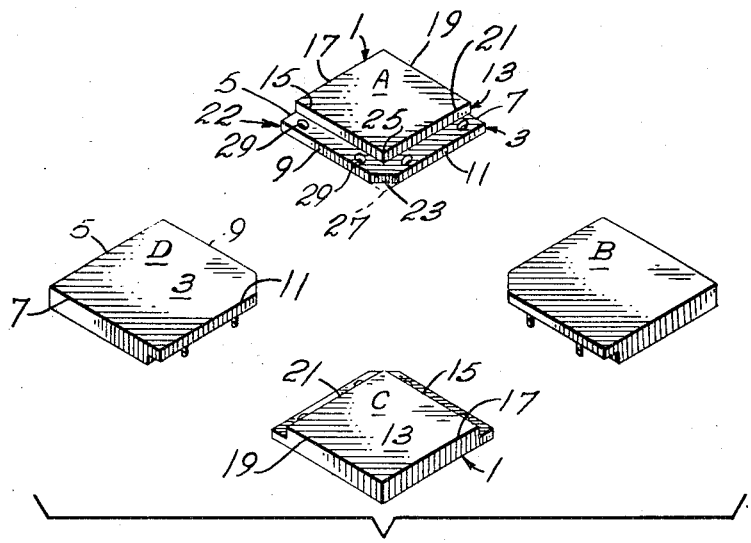
FIG. 1
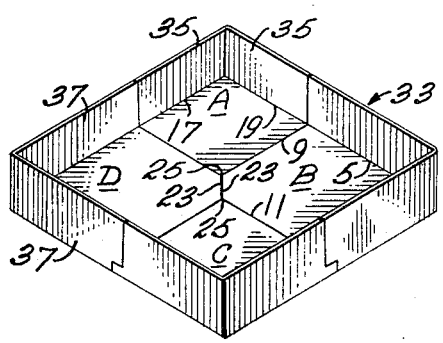
FIG. 2
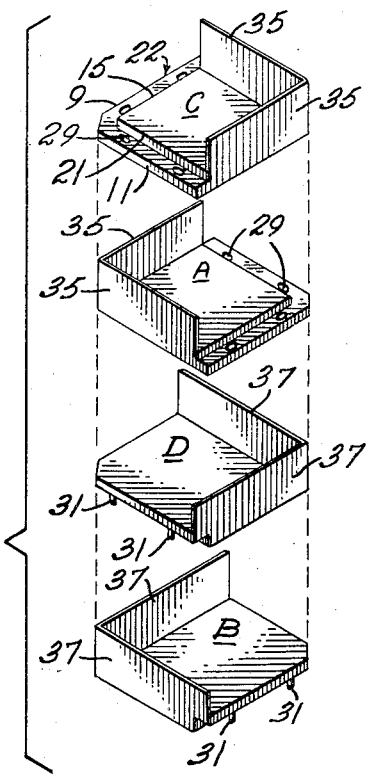
FIG. 3
INVENTOR
Walter Andrew REID
ATTORNEY United States Patent Office 3,488,900
Patented Jan. 13, 1970

3,488,900
CAMPING FLOOR PANEL
Walter Andrew Reid, 17050 St. Mary's Road,
Kirkland, Quebec, Canada
Filed Dec. 7, 1967, Ser. No. 688,713
Int. Cl. E04b 5/00; E04c 1/00
U.S. Cl. 52—79     3 Claims

ABSTRACT OF THE DISCLOSURE

A car-portable camping floor panel constructed in such a manner that four identical panels can be assembled on a campsite in interlocking relationship to form a camp floor.

---

This invention relates to a car-portable camping floor panel unit.

There are at the present time many portable camping structures which may be transported by car by a person going on a camping trip. One type of camping device now popular comprises a small trailer which can be towed by a car. The trailer is compact, holds all the equipment required for a camping trip, and the floor of the trailer is large enough to provide a solid floor area for sleeping on when camping. For the person who does not wish to go to the expense of purchasing a trailer for transporting his camping equipment, open, boxlike camper structures have been made to fit on the roof of a car to transport the camping equipment. These camper structures, however, have a floor area which is too small for persons wishing to sleep on a solid floor.

It is the purpose of the present invention to provide means which can be transported on the top of a car and which can provide a solid floor at a campsite.

More particularly, it is the purpose of the present invention to provide a car-top transportable floor panel unit. Four of the floor units can be quickly assembled to provide a floor area large enough for sleeping on at a campsite. The floor units, when provided with side walls, can be transported in stacked relationship on the top of a car with the side walls forming an enclosure for carrying camping equipment.

The floor unit of the present invention comprises a first substantially rectangular panel portion of a width no wider than the width of a car joined in overlapping relation with a second smaller rectangular panel portion of the same thickness as the first portion. When attached, two adjacent sides of one panel portion are vertically aligned with two adjacent sides of the other panel portion. The other two adjacent sides of the first panel portion are joined by a bevelled vertical side extending at a 45° angle to these other sides.

The floor units are constructed so that four of the units can be connected together to form a solid floor large enough for a person to sleep on. Two of the units are arranged diagonally opposed to each other with their angled sides face to face and with their smaller panel portions facing upwardly. The other two units are also arranged diagonally opposed with their angled sides face to face and with their smaller panel portions facing downwardly. The four units are connected to form a floor with the sides of each panel joined by the bevelled sides overlapping the edges of adjacent panels. The floor so formed has a smooth planar rectangular surface and smooth planar edges.

Each floor unit can be provided with two adjacent side walls. In the four units used to form a floor, two of the units are provided with the side walls extending upwardly from the two adjacent sides of the smaller panel portions, which sides are vertically aligned with sides of the other panel portion. Each of the other two units has side walls extending upwardly from the sides of the first panel portion which are vertically aligned with the sides of the smaller panel portion thereon. The floor units with the side walls can be arranged in nesting relationship one on top of the other with the corners formed where the walls meet diagonally opposite the wall corner of the unit below. This nested assembly allows all four units complete with walls to be easily transported on top of a car with the walls providing an enclosure for holding any camping equipment.

The invention will now be described in detail having reference to the drawings wherein:

FIGURE 1 is a schematic view of four individual floor units;

FIGURE 2 is a schematic view of the floor units, having side walls, assembled to form a floor; and FIGURE 3 is an exploded schematic view showing how the four floor units, having side walls, are arrranged in a nesting assembly for transportation of the units as a car-top camper.

Each of the four floor units A, B, C and D shown in FIGURE 1 is substantially of similar construction, and therefore only one of the units will be described in detail. While the units can be rectangular or square in shape, the detailed description will be directed toward square units. The floor unit 1 comprises a substantially square panel portion 3 having sides 5, 7, 9 and 11. A smaller square panel portion 13 having sides 15, 17, 19 and 21 is joined in overlapping face-to-face relationship with the block portion 3. Two adjacent sides 17 and 19 of the smaller panel portion are vertically aligned with two adjacent sides 5 and 7 of the other panel portion. With this arrangement, the unit 1 has a flange 22 along two adjacent sides formed by the exposed area of the panel 3 which is not covered by the panel 13. The first or larger panel portion 3 has its other side surfaces 9 and 11 joined by a bevelled vertical side 23. The bevelled side 23 is located at a 45° angle to the direction of the sides 9 and 11. The side 23 passes midway between the corner 25 formed where the sides 15 and 21 of panel portion 13 meet and an imaginary corner 27 which would be formed if sides 9 and 11 of panel portion 3 were extended. The floor unit has a width substantially no wider than the width of the top of a car. The units can be made in various sizes to fit on the roofs of different cars. The width of each unit preferably is between 4 and 5 feet. The floor unit can be made in various ways. It could be made out of two sheets of plywood, one sheet forming the square panel portion 3 and a second square sheet 13 of the same thickness but slightly smaller in area than the portion 3 and glued or nailed thereto. In the preferred form of construction, the floor unit 1 is moulded from plastic material so as to have the panel portions 3 and 5 integrally formed with one another. The moulded floor unit can be made out of mouldable plastic which has sufficient strength to form a floor strong enough to transport goods and to sleep on.

To form a floor out of four such units 1, four identical units A, B, C and D are used with two of the units inverted with respect to the other two units. As shown in FIGURE 2, two of the units A, C are positioned with their lower panel portions on top and diagonally opposed to one another with their bevelled sides 23 adjacent each other. The other two floor units B, D are positioned diagonally opposite to each other with their bevelled sides 23 adjacent each other and with their smaller panel portion on the bottom. The four units are thus arranged with the flanges 22 on units B, D overlapping the flanges on units A, C to form a floor. Since the flanges are half the thickness of each unit and are on only two sides of each unit, the floor has a smooth planar upper surface and smooth planar side surfaces. The units forming the floor can be held detachably together in assembled relationship by various means. As shown in FIGURE 1, by way of example, holes 29 can be provided on the flanges 22 of units A and C, and dowels 31 can be provided on the flanges of units B and D. The dowels 31 fit into the holes 29 of adjacent units to interlock the units together.

Each floor unit can be provided with side walls as shown in FIGURES 2 and 3. In order to form a complete wall enclosure 33 when four units are connected to form a floor, two of units A, C, when in position where their small panel portion 13 is on top, are provided with two adjacent side walls 35 extending upwardly from the sides 17 and 19 aligned with the sides 5 and 7 of the larger panel portion 3. The other two panels B, D, when in position where their small panel portion is on the bottom, have two adjacent side walls 37 extending upwardly from sides 5 and 7 aligned with sides 17 and 19 of the small panel portion 13. The side walls 37, extending along the sides of the larger panel portion 3, are longer than the side walls 35. As shown in FIGURE 2, when the four units are assembled to form a solid floor, the side walls abut each other to form an enclosure 33 for the floor area.

The side walls 35 and 37 may be permanently attached to or moulded integrally with each floor unit or alternatively may be detachably connected thereto and transported in a flat position. The side walls can be made of the same material as the floor units.

The four units may be transported one on top of the other on top of a car. If the floor units are provided with walls 33 which are not detachable, the units can be easily transported by arranging them in a nested assembly. The four units are nested one on top of the other with the corners formed by the wall on each unit being diagonally opposed to the corner formed by the wall on the unit below it. This arrangement permits the units to be stacked or nested into a compact space while the wall portions of the upper two floor units provide an enclosure in which camping equipment may be stored.

Various additions and modifications will be obvious to people skilled in the art without departing from the scope of the invention disclosed.

I claim:
1. A solid floor comprising four detachably connected car portable square floor panel units, each unit comprising a first substantially rectangular panel portion, a second smaller rectangular panel portion of the same thickness as the first portion, the two panel portions being joined together in face-to-face relationship with corresponding two adjacent edges of the two portions being common and forming planar surfaces, while the other two adjacent edges of the second portion are spaced inwardly of the other two adjacent edges to the first portion, said other two adjacent edges of the first panel portion being joined by a bevelled edge extending at a 45° angle to the said other edges, first and second units positioned diagonally opposite each other with their bevelled edges abutting and with their smaller panel portion on top, third and fourth units positioned diagonally opposite each other with their bevelled edges abutting and with their smaller panel portion on the bottom, the four units overlapping each other and being detachably connected together to define a solid floor having smooth planar rectangular upper surface and smooth planar edge surfaces, and the bevelled edge on each unit passing midway between a corner formed where the other two adjacent edges of the second panel portion meet and an imaginary corner which would be formed where planar extensions of the other two adjacent edges of the first panel portion meet.

2. A floor as claimed in claim 1 wherein the first and second units have two adjacent side walls extending upwardly from the two adjacent edges of the smaller panel portion which are vertically aligned with the two adjacent edges of the larger panel, the third and fourth units having two adjacent side walls extending vertically upwardly from the two adjacent edges of the larger panel portion which are vertically aligned with the two adjacent edges of smaller panel, the wall portions cooperating with each other to form an enclosure about the four units.

3. A car-top camper comprising four floor panel units, each floor unit comprising a first substantially rectangular panel portion, a second smaller rectangular panel portion of the same thickness as the first portion, the two panel portions being joined together in face-to-face relationship with corresponding two adjacent edges of the two portions being common and forming planar surfaces, while the other two adjacent edges of the second portion are spaced inwardly of the other two adjacent edges to the first portion, said other two adjacent edges of the first panel portion being joined by a bevelled edge extending at a 45° angle to said other edges, two of the units having two adjacent side wall portions extending upwardly from the two adjacent edges of the second panel which are vertically aligned with two adjacent edges of the first panel when the second panel portion is uppermost, the other two units having two adjacent side wall portions extending upwardly from the two adjacent edges of the larger panel which are vertically aligned with two adjacent edges of the second panel when the first panel portion is uppermost, the units being nested one on top of the other with the corners formed by the side walls of each unit diagonally opposite the corners defined by the walls of the unit below so as to provide a compact structure suitable for transportation on top of a car, and the bevelled edge on each unit passing midway between a corner formed where the other two adjacent edges of the second panel portion meet and an imaginary corner which would be formed where planar extensions of the other two adjacent edges of the first panel portion meet.

References Cited

UNITED STATES PATENTS

| | | | |
|---|---|---|---|
| 1,832,397 | 11/1931 | Hultquist | 52—592 |
| 621,100 | 5/1899 | Knowles | 52—590 |
| 1,356,348 | 10/1920 | Evans | 52—592 |
| 1,452,684 | 4/1923 | Hamilton | 52—592 |
| 2,034,183 | 3/1936 | Harris | 220—4 |
| 3,287,865 | 11/1966 | Lockman | 52—79 |

FOREIGN PATENTS

| | | |
|---|---|---|
| 1,268,496 | 5/1959 | France. |
| 559,884 | 3/1944 | Great Britain. |
| 717,032 | 11/1954 | Great Britain. |
| 32,103 | 9/1904 | Switzerland. |

HENRY C. SUTHERLAND, Primary Examiner

U.S. Cl. X.R.

52—173, 264, 592, 593